US012607464B2

(12) United States Patent
Araújo et al.

(10) Patent No.: US 12,607,464 B2
(45) Date of Patent: Apr. 21, 2026

(54) LOCALIZATION USING SENSORS THAT ARE TRANSPORTABLE WITH A DEVICE

(71) Applicant: Telefonaktiebolaget LM Ericsson (publ), Stockholm (SE)

(72) Inventors: José Araújo, Stockholm (SE); AmirHossein Taher Kouhestani, Solna (SE); Diego Gonzalez Morin, Galapagar (ES); Ioannis Karagiannis, Kalamata (GR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 329 days.

(21) Appl. No.: 17/783,470

(22) PCT Filed: Dec. 18, 2019

(86) PCT No.: PCT/EP2019/085964
§ 371 (c)(1),
(2) Date: Jun. 8, 2022

(87) PCT Pub. No.: WO2021/121577
PCT Pub. Date: Jun. 24, 2021

(65) Prior Publication Data
US 2022/0412740 A1 Dec. 29, 2022

(51) Int. Cl.
*G01C 21/16* (2006.01)
*G06F 1/3212* (2019.01)
*H04W 4/02* (2018.01)

(52) U.S. Cl.
CPC ......... *G01C 21/165* (2013.01); *G06F 1/3212* (2013.01); *H04W 4/027* (2013.01)

(58) Field of Classification Search
CPC .............. G01C 21/165; G01C 21/1652; G01C 21/1656; G01C 21/3848; G06F 1/3212;
(Continued)

(56) References Cited

U.S. PATENT DOCUMENTS

| | | | |
|---|---|---|---|
| 2011/0300875 A1 | 12/2011 | Kim et al. | |
| 2014/0330453 A1* | 11/2014 | Nakagawa | ............. B60L 53/63 |
| | | | 701/2 |

(Continued)

FOREIGN PATENT DOCUMENTS

| | | |
|---|---|---|
| JP | 2016520812 A | 7/2016 |
| KR | 20160112137 A | 9/2016 |

(Continued)

OTHER PUBLICATIONS

International Search Report and Written Opinion of the International Searching Authority for PCT International Application No. PCT/EP2019/085964 dated Sep. 8, 2020.

(Continued)

*Primary Examiner* — Anil K Bhargava
(74) *Attorney, Agent, or Firm* — Sage Patent Group

(57) ABSTRACT

A device is configured for performing localization using a set of sensors that are transportable with the device. The device includes at least one processor operationally connected to the set of sensors, and at least one memory that stores program code. The program code configures the at least one processor to determine a first set of device poses where a first sensor satisfies a localization performance rule, and to determine a second set of device poses where a second sensor satisfies the localization performance rule. The at least one processor is further configured to activate the second sensor while the first sensor is active based on a pose of the device transitioning from not being within to being within the second set of device poses.

24 Claims, 10 Drawing Sheets

(58) Field of Classification Search
CPC .......... G01S 17/86; G06T 2207/10028; G06T 2207/30168; G06T 2207/30244
See application file for complete search history.

(56)                    References Cited

U.S. PATENT DOCUMENTS

| | | | |
|---|---|---|---|
| 2015/0097731 A1 | 4/2015 | Russell | |
| 2015/0363974 A1* | 12/2015 | Nakai | G06V 20/20 |
| | | | 345/88 |
| 2016/0277883 A1 | 9/2016 | Jeon | |
| 2018/0100762 A1* | 4/2018 | Park | G01J 1/0219 |
| 2018/0114133 A1* | 4/2018 | Chowdhary | G06F 1/3287 |
| 2018/0348023 A1* | 12/2018 | Klein | G01D 18/00 |
| 2019/0096081 A1* | 3/2019 | Gupta | G06T 5/00 |
| 2019/0278354 A1* | 9/2019 | Alameh | G06F 3/013 |
| 2019/0355169 A1* | 11/2019 | Sapienza | G06V 20/20 |
| 2020/0033127 A1 | 1/2020 | Tsujii et al. | |
| 2020/0344389 A1* | 10/2020 | Diehl | H04N 23/55 |
| 2021/0125664 A1* | 4/2021 | Holland | G06T 19/006 |

FOREIGN PATENT DOCUMENTS

| | | | |
|---|---|---|---|
| WO | 2018179644 A1 | 10/2018 | |
| WO | 2019065431 A1 | 4/2019 | |

OTHER PUBLICATIONS

First Office Action for Chinese Patent Application No. 201980103074. 9, mailed Sep. 20, 2024, 10 pages.
Summary of the Notice of Preliminary Rejection, Korean Patent Application No. 2022-7024570, mailed Nov. 25, 2024, 9 pages.

* cited by examiner

System 450

Figure 6

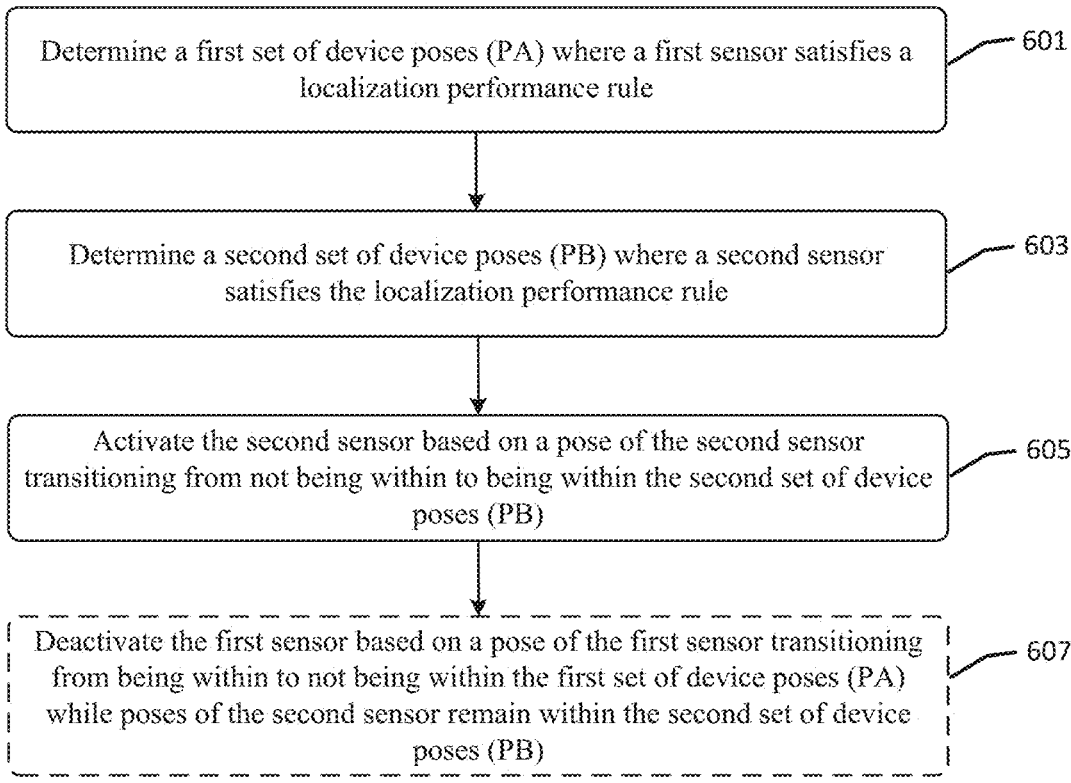

Determine a first set of device poses (PA) where a first sensor satisfies a localization performance rule — 601

Determine a second set of device poses (PB) where a second sensor satisfies the localization performance rule — 603

Activate the second sensor based on a pose of the second sensor transitioning from not being within to being within the second set of device poses (PB) — 605

Deactivate the first sensor based on a pose of the first sensor transitioning from being within to not being within the first set of device poses (PA) while poses of the second sensor remain within the second set of device poses (PB) — 607

Figure 7

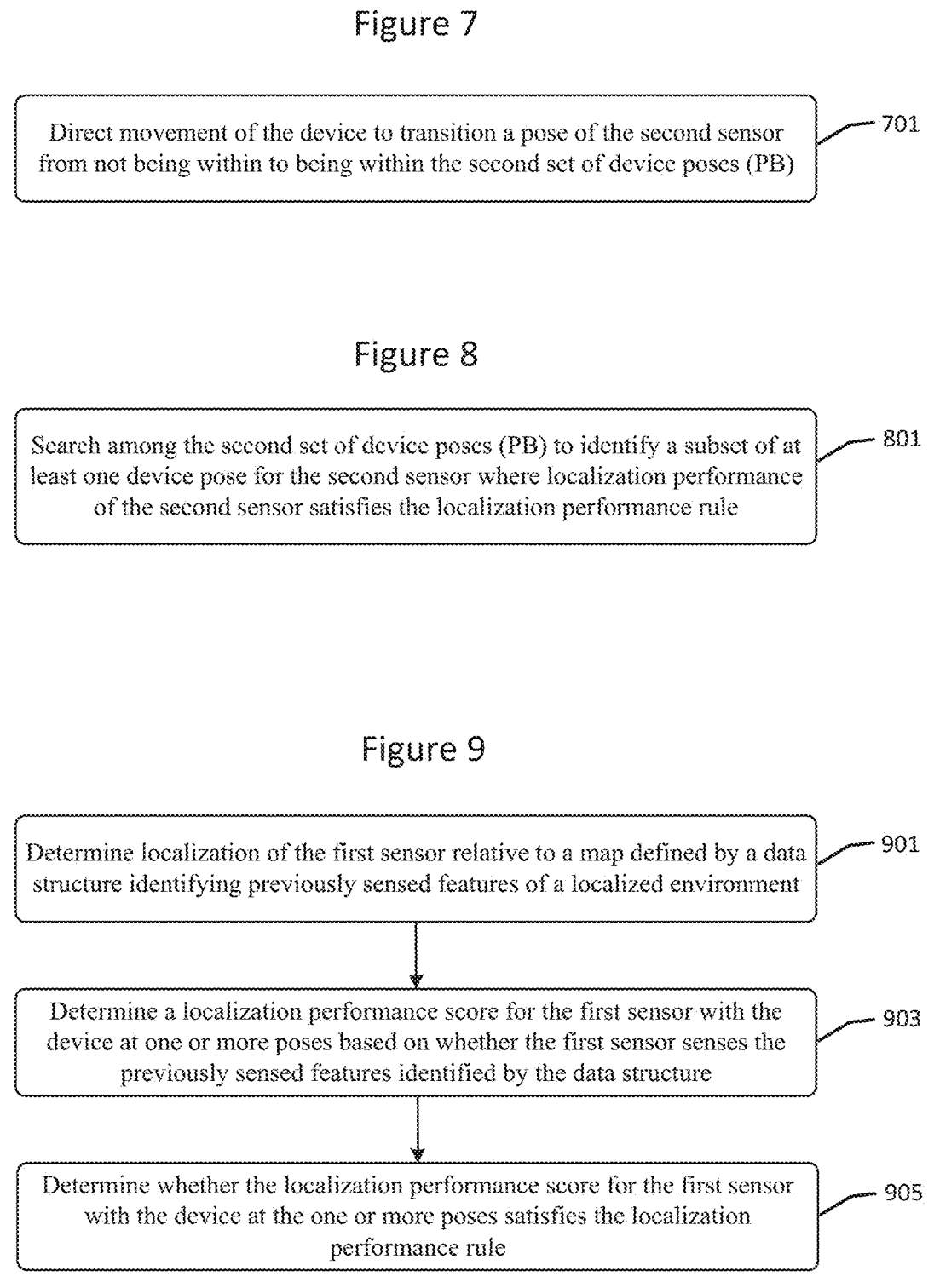

Direct movement of the device to transition a pose of the second sensor from not being within to being within the second set of device poses (PB) — 701

Figure 8

Search among the second set of device poses (PB) to identify a subset of at least one device pose for the second sensor where localization performance of the second sensor satisfies the localization performance rule — 801

Figure 9

Determine localization of the first sensor relative to a map defined by a data structure identifying previously sensed features of a localized environment — 901

Determine a localization performance score for the first sensor with the device at one or more poses based on whether the first sensor senses the previously sensed features identified by the data structure — 903

Determine whether the localization performance score for the first sensor with the device at the one or more poses satisfies the localization performance rule — 905

Figure 10

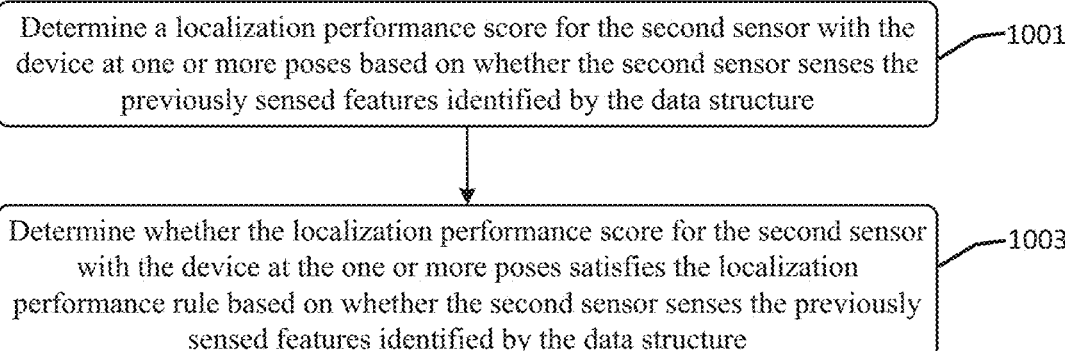

Determine a localization performance score for the second sensor with the device at one or more poses based on whether the second sensor senses the previously sensed features identified by the data structure — 1001

Determine whether the localization performance score for the second sensor with the device at the one or more poses satisfies the localization performance rule based on whether the second sensor senses the previously sensed features identified by the data structure — 1003

Figure 11

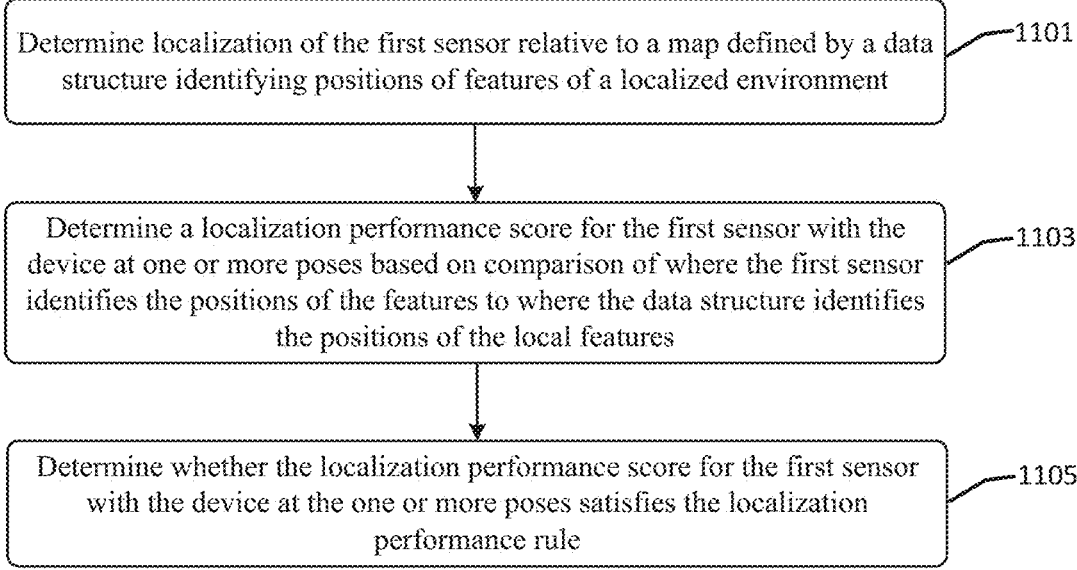

Determine localization of the first sensor relative to a map defined by a data structure identifying positions of features of a localized environment — 1101

Determine a localization performance score for the first sensor with the device at one or more poses based on comparison of where the first sensor identifies the positions of the features to where the data structure identifies the positions of the local features — 1103

Determine whether the localization performance score for the first sensor with the device at the one or more poses satisfies the localization performance rule — 1105

Figure 12

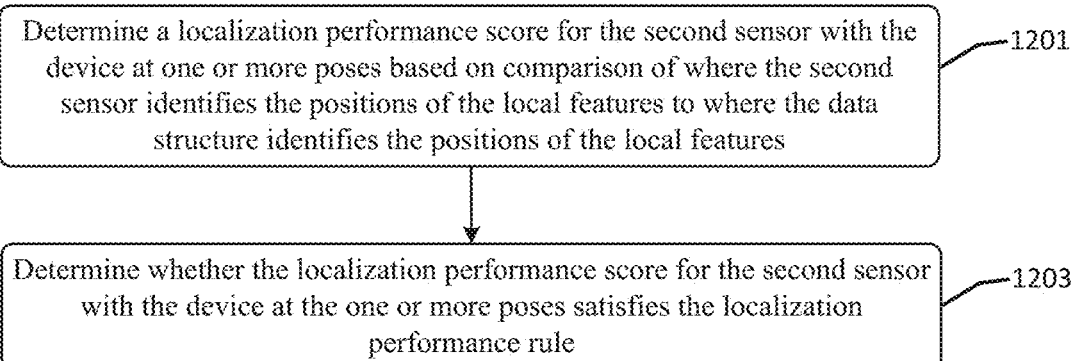

Determine a localization performance score for the second sensor with the device at one or more poses based on comparison of where the second sensor identifies the positions of the local features to where the data structure identifies the positions of the local features ⎯1201

Determine whether the localization performance score for the second sensor with the device at the one or more poses satisfies the localization performance rule ⎯1203

Figure 13

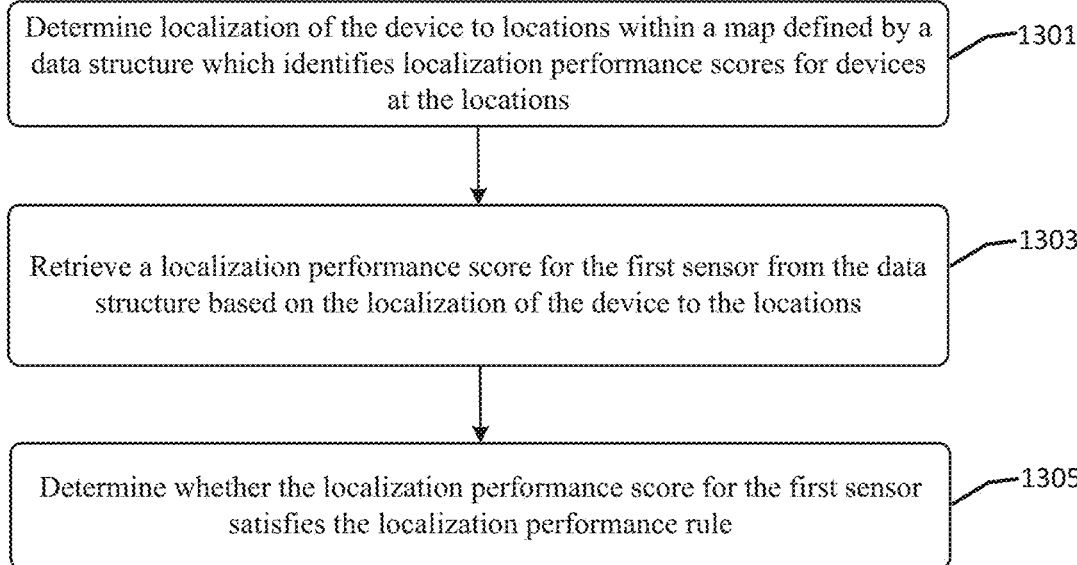

Determine localization of the device to locations within a map defined by a data structure which identifies localization performance scores for devices at the locations ⎯1301

Retrieve a localization performance score for the first sensor from the data structure based on the localization of the device to the locations ⎯1303

Determine whether the localization performance score for the first sensor satisfies the localization performance rule ⎯1305

Figure 14

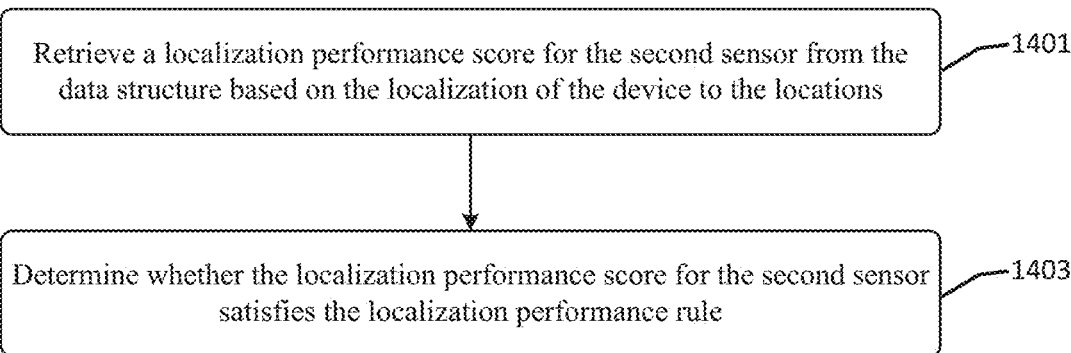

Retrieve a localization performance score for the second sensor from the data structure based on the localization of the device to the locations ———1401

Determine whether the localization performance score for the second sensor satisfies the localization performance rule ———1403

Figure 15

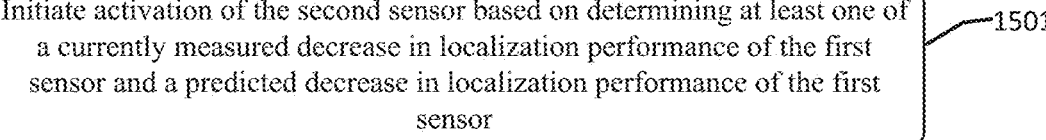

Initiate activation of the second sensor based on determining at least one of a currently measured decrease in localization performance of the first sensor and a predicted decrease in localization performance of the first sensor ———1501

Figure 16

Initiate activation of the second sensor based on determining that the first sensor uses more than a threshold amount of a defined hardware resource ———1601

LOCALIZATION USING SENSORS THAT ARE TRANSPORTABLE WITH A DEVICE

CROSS REFERENCE TO RELATED APPLICATION

This application is a 35 U.S.C. § 371 national stage application of PCT International Application No. PCT/EP2019/085964 filed on Dec. 18, 2019, the disclosure and content of which is incorporated by reference herein in its entirety.

TECHNICAL FIELD

The present disclosure relates to a device configured for performing localization using a set of sensors that are transportable with the device, a method by a device performing localization using a set of sensors that are transported with the device, and a corresponding computer program product.

BACKGROUND

Localization and mapping algorithms, such as Simultaneous localization and mapping (SLAM) algorithms, are a technology that allows devices to localize themselves in an environment while relying on onboard sensors such as cameras, range sensors, inertial sensors among others. This is essential for robots to navigate and understand an environment to perform a task, as well as for enabling realistic and persistent content to be displayed in mixed reality devices.

For example, current Mixed Reality (MR) headsets and state-of-the-art smartphones contain RGB cameras, depth/3D cameras (e.g. passive or active stereo, LIDAR, etc.) and inertial sensors (IMU) and the same is true for indoor and outdoor robots, such as drones and autonomous vehicles. For example, Intel and Microvision have recently launched small "consumer" oriented LIDAR products. However, other depth sensors or 3D sensors are very commonplace in headsets and other devices such as robots.

Several SLAM algorithms have been proposed which rely on RGB and IMU sensors, depth sensors or a combination of all of these. A reason for using a combination of different types of sensors is to leverage unique operational advantages of the differing sensors, and to improve on their individual limitations. For example, an RGB camera performs poorly in a dark or too bright environment since visual features are hard or impossible to acquire in such environments, where a depth camera such as a LIDAR or active stereo camera would perform well in such scenarios. Moreover, by directly measuring depth the localization and mapping may be performed with higher accuracy and may capture a larger amount of information of the environment (e.g. construction of a dense map instead of a sparse map), among other benefits. However, depth cameras usually have a larger energy consumption and processing requirements and may perform poorly in certain conditions. For example, depth cameras have a limited measurement range, and may perform badly in low textured environments (passive stereo cameras) and in areas with directly sunlight or IR interference (active stereo cameras and LIDAR), under rain conditions (LIDAR), among other limitations. Hence, it is desirable to schedule the usage of all the available sensors to achieve accurate and robust localization and mapping while also reducing the energy resources of the device.

Current solutions assume that all sensors are always turned on (e.g. Microsoft HoloLens or any other AR headset which has these multiple sensors).

SUMMARY

Some embodiments disclosed herein are directed to a device configured for performing localization using a set of sensors that are transportable with the device. The device includes at least one processor operationally connected to the set of sensors, and at least one memory that stores program code. The program code configures the at least one processor to determine a first set of device poses (PA) where a first sensor satisfies a localization performance rule, and to determine a second set of device poses (PB) where a second sensor satisfies the localization performance rule. The at least one processor is further configured to activate the second sensor while the first sensor is active based on a pose of the device transitioning from not being within to being within the second set of device poses (PB).

Some related other embodiments disclosed herein are directed to a method by a device performing localization using a set of sensors that are transported with the device. The method includes determining a first set of device poses (PA) where a first sensor satisfies a localization performance rule, and determining a second set of device poses (PB) where a second sensor satisfies the localization performance rule. The method activates the second sensor while the first sensor is active based on a pose of the device transitioning from not being within to being within the second set of device poses (PB).

Some related other embodiments disclosed herein are directed to a computer program product for performing localization of a device using a set of sensors that are transported with the device. The computer program product includes a non-transitory computer readable medium storing program code that is executable by at least one processor of the device. The program code configures the at least processor to determine a first set of device poses (PA) where a first sensor satisfies a localization performance rule, and determine a second set of device poses (PB) where a second sensor satisfies the localization performance rule. The program code further configures the at least one processor to activate the second sensor while the first sensor is active based on a pose of the device transitioning from not being within to being within the second set of device poses (PB).

A potential advantage that may be provided by these and other embodiments is that activation of the second sensor enables the device to be able to deactivate the first sensor, with the localization then being performed using data from the second sensor instead of from the first sensor. This can result in reduction in power consumption of the system and enable more optimized use of resources while continuing to satisfy ongoing localization performance requirements. The localization performance rule can be configured based on the performance/robustness of the localization when a sensor is activated/deactivated, which is a very relevant solution since sensors perform differently depending on the environment characteristics. The embodiments can support graceful switching between sensors to optimize use of resources and while avoiding degradation of localization operations.

Other devices, methods, and computer program products according to embodiments will be or become apparent to one with skill in the art upon review of the following drawings and detailed description. It is intended that all such devices, methods, and computer program products be included within this description, be within the scope of the present disclosure, and be protected by the accompanying claims. Moreover, it is intended that all embodiments disclosed herein can be implemented separately or combined in any way and/or combination.

BRIEF DESCRIPTION OF THE DRAWINGS

Aspects of the present disclosure are illustrated by way of example and are not limited by the accompanying drawings. In the drawings:

FIGS. 6 through 16 illustrate flowcharts of operations for controlling deactivation and activation of sensors used by a device for localization in accordance with some embodiments of the present disclosure.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Figure 1:
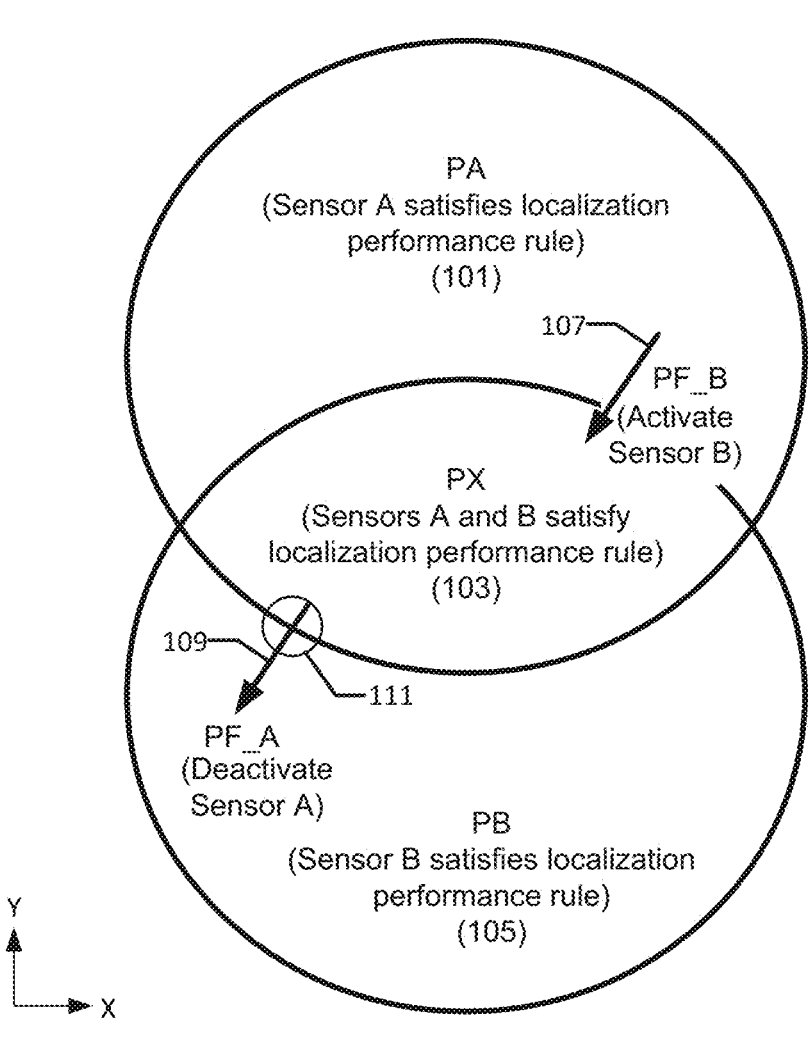
FIG. 1 illustrates a top view of a geographic map showing movement of a device between different regions and associated sensor activation/deactivation operations in accordance with some embodiments of the present disclosure.

FIG. 1 illustrates a top view of a geographic map showing movement of a device between different regions and associated sensor activation/deactivation operations in accordance with some embodiments of the present disclosure. The device is configured to use a set of sensors to perform localization operations and may further perform combined localization and mapping operations, such as SLAM operations. The set of sensors includes a first sensor, Sensor A, which is assumed to be active, and a second sensor, Sensor B, which is assumed to be inactive. In the illustrated embodiments, the operations determine a pose, e.g., position and/or orientation, of the device and identify timing for when Sensor B is to be activated, and further determine another pose, e.g., position and/or orientation, of the device and temporal instant when Sensor A is to be deactivated.

As used herein, the term "pose" refers to the position and/or the orientation of one device (e.g., mobile electronic device) relative to a defined coordinate system or may be relative to another device (e.g., headset). A pose may therefore be defined based on only the multidimensional position of one device relative to another device or to a defined coordinate system, only on the multidimensional orientation of the device relative to another device or to a defined coordinate system, or on a combination of the multidimensional position and the multidimensional orientation. The term "pose" therefore is used to refer to position, orientation, or combination thereof.

The device can be configured to determine a set of device poses (positions and/or orientations) where respective ones of the Sensors A and B can be used to satisfy a localization performance rule during the transition from using Sensor A to using Sensor B. When a pose is determined it may then be used to generate guidance that can be provided to the user and/or to the device to guide movement of the device to obtain a pose in which the localization performance rule is satisfied to allow transition between sensors. Thus, Sensor A is deemed to satisfy the localization performance rule when its data processed by the localization operation results in device localization with an accuracy which satisfies the localization performance rule, or when an estimate of the accuracy of device localization that would be achieved using data from Sensor A would satisfy the localization performance rule. Similarly, Sensor B is deemed to satisfy the localization performance rule when its data processed by the localization operation results in device localization with an accuracy which satisfies the localization performance rule, or when an estimate of the accuracy of device localization that would be achieved using data from Sensor B would satisfy the localization performance rule.

In some embodiments, the activation and/or deactivation of individual sensors is performed at a suitable device pose where there are sufficient available environment features which can be acquired by the sensors to enable localization operations to be performed on the data from the sensors with sufficient accuracy to satisfy a localization performance rule. Performing sensor activation and/or deactivation in this manner enables the localization operations and/or combined localization and mapping operations, e.g., SLAM, to be performed under reduced power consumption while providing a sufficiently high level of performance and robustness. The need for switching between sensors can be motivated by a current or predicted decrease of the localization performance and/or combined localization and mapping performance, e.g., SLAM performance. As will be further detailed below, a decision to transition from using Sensor A to activating and using Sensor B, can be triggered based on determining that Sensor B will perform better than Sensor A, determining that Sensor A consumes more power to operate than Sensor B, etc.

In some embodiments, an operation to activate a sensor can include triggering the sensor to transition to a higher power state or triggering power-on of the sensor. Similarly, an operation to deactivate a sensor can include triggering the sensor to transition to a lower power state or triggering power-off of the sensor. In some other embodiments, an operation to deactivate a sensor can include setting a data sampling rate of the sensor to a reduced sampling rate or zero, and an operation to activate a sensor can include setting a data sampling rate of the sensor to an increased sampling rate (sufficient for use in performing localization operations). In some other embodiments, an operation to deactivate a sensor can include setting a resolution of the sensor to a reduced resolution or zero, and an operation to activate a sensor can include setting a resolution of the sensor to an increased resolution (sufficient for use in performing localization operations).

Although various embodiments are described in the context of activating and deactivating individual sensors, e.g., Sensor A and Sensor B, these embodiments may be used to activate and deactivate sets of sensors. Thus, for example, Sensor A may correspond to a set A of sensors and similarly Sensor B may correspond to a set B of sensors. The activation of Sensor B and the deactivation of Sensor A is selectively performed when the device is at a suitable location where certain sensor characteristics are determined to be achievable, such as because there are sufficient available environment features which can be acquired from both sensors when the switching between sensors occurs to enable localization to be performed with sufficient accuracy to satisfy the localization performance rule. By doing so, Sensor A performs well until the moment that Sensor B is activated, and Sensor B can perform well from that moment onwards, which enables a smooth transition between using both sensors for localization to using only one sensor for localization in a way that may not reduce, or may reduce within an acceptable amount, the performance and robustness of localization operations processing data from the sensors. By performing the transition at such device location, the energy consumption for sensor usage is potentially reduced since the amount of time for which both sensors have to be active simultaneously is reduced. With this solution it is possible that no time is lost attempting to find a location where Sensor B will start performing well once it is activated if the switch from using Sensor A to using Sensor B would take place at a location where Sensor B does not perform well, which would also save energy.

FIG. 1 illustrates a top view of a geographic map showing movement of a device between different regions and associated sensor activation/deactivation operations in accordance with some embodiments of the present disclosure.

Referring to the illustrative example of FIG. 1, a geographic region PA is illustrated where Sensor A satisfies a localization performance rule, another geographic region PB is illustrated where Sensor B satisfies the localization performance rule, and an overlap region PX is illustrated where both Sensors A and B satisfy the localization performance rule.

While a device which performs localization operations using data from the Sensors A and B is within region PA, where only Sensor A satisfies the localization performance rule, and outside region PX Sensor A actively feeds data to the localization algorithm or combined localization and mapping algorithm, e.g., SLAM algorithm, and Sensor B is deactivated. When the device moves along path segment PF_B from region PA to region PX, where Sensors A and B both satisfy the localization performance rule, Sensor B may be activated and Sensor A may be deactivated depending upon the relative power consumption, localization performance, combined localization and mapping performance (e.g., SLAM performance), resource utilization, etc., of Sensors A and B. In region PX localization can be performed using data from one or both of Sensors A and B. As the device moves along path segment PF_A to region PB and outside region PX, Sensor B actively feeds data to the localization algorithm or combined localization and mapping algorithm, e.g., SLAM algorithm, and Sensor A is deactivated.

As used herein, a localization performance rule can include a set of conditions which can be the same or different for each of the sensors. For example, the condition(s) that are used to determine whether one sensor satisfies the localization performance rule can be the same or different from the condition(s) that are evaluated to determine whether another sensor satisfies the localization performance rule. The conditions(s) can depend upon the operational characteristics of the respective sensors, such as operational characteristics of a visible light (RGB) camera, the operational characteristics of an infrared (IR) camera, the operational characteristics of a LIDAR sensor, etc.

Figure 3:
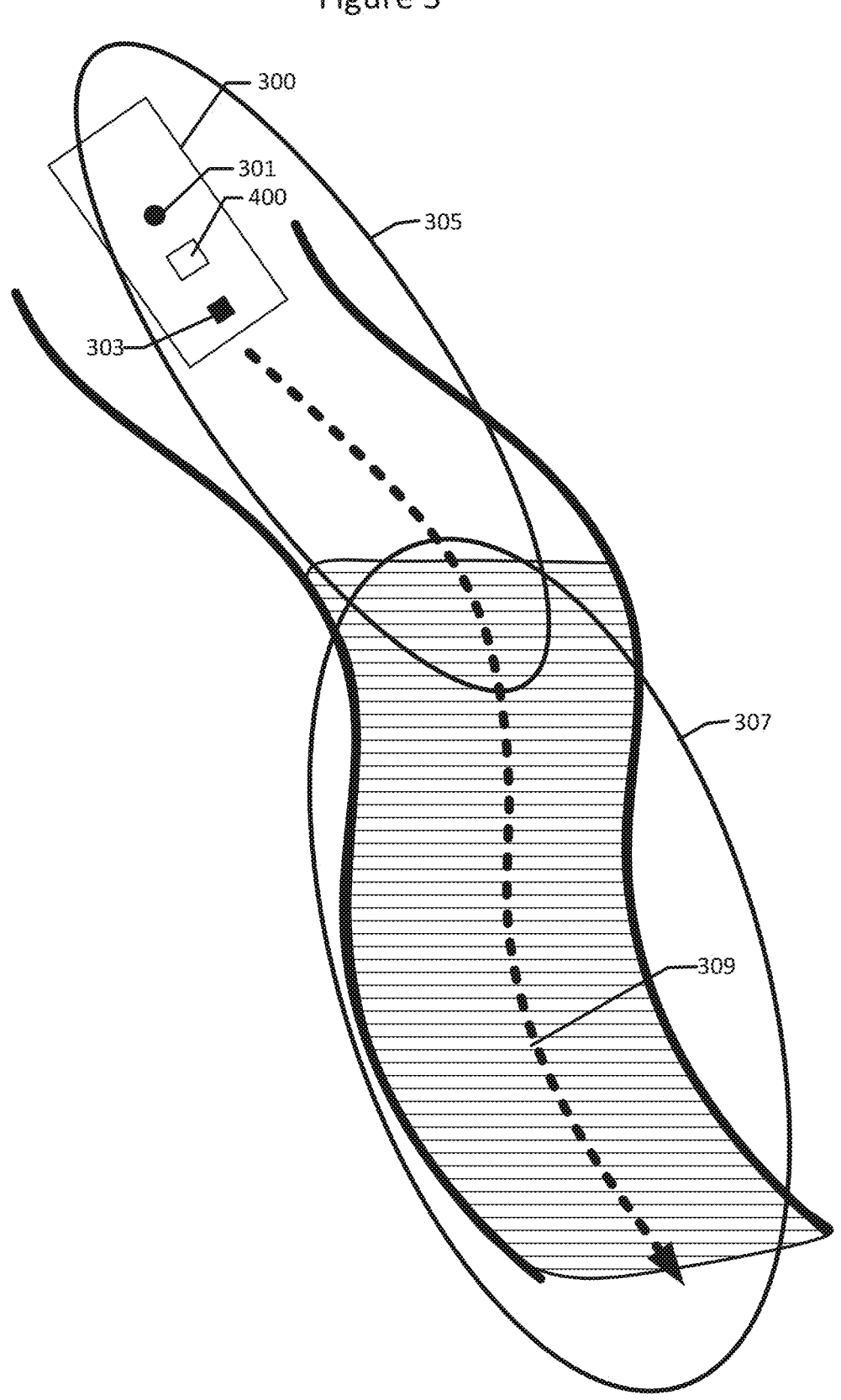
FIG. 3 illustrates a top view of a geographic map showing movement of a vehicle transporting a device and a set of sensors through an example environment in accordance with some embodiments of the present disclosure.

FIG. 3 illustrates a top view of a geographic map showing movement of a vehicle 300 transporting a device 400 that performs localization using a set of sensors 301 and 303 that are transportable with the device 400. The device and sensors may be transported in other ways, such as by a human, robot, aircraft (e.g., drone), ship, etc. The device 400 can be, but is not limited to, a component of any of a smartphone, wearable computer, augmented reality headset, virtual reality headset, mixed reality headset, semi-autonomous or autonomous vehicle, drone, aircraft, robot, etc. Although only two sensors are illustrated it is to be understood that the device 400 configured to perform localization operations or combined localization and mapping operations, e.g., SLAM, using any plural number of sensors that are configured to feed an appropriate type of data. Example types of sensors include, but are not limited to, RGB visible light camera, infrared camera, stereo cameras, inertial measurement unit (IMU), radar sensor, light detection and ranging (LIDAR) sensor, acoustic ranging sensor, proximity sensor, GPS, and RF transceiver (e.g., 5G-radio).

Referring to FIG. 3, as the vehicle 300 travels along the path 309 (e.g., road) through an environment the device 400 performs localization operations or combined localization and mapping operations, e.g. SLAM, using one or more of the sensors 301 and 303 to sense features of the environment in a proximate region. For example, in a first region 305 the first sensor 301 is active and the second sensor 303 is deactivated. The device 400 determines that the first sensor 301 satisfies a localization performance rule, which results in the device maintaining the first sensor 301 activated and the second sensor 303 deactivated while the vehicle 300 remains in the first region 305. Sensor 301 can be deemed to satisfy the localization performance rule when its data processed by a localization algorithm results in device localization with an accuracy which satisfies the localization performance rule. The vehicle 300 subsequently travels into a second region 307 where the device 400 determines that the second sensor 303 can satisfy the localization performance rule. Sensor 303 can be deemed to satisfy the localization performance rule when an estimate of the accuracy of device localization that would be achieved using data from sensor 303 would satisfy the localization performance rule. As a result, the device 400 can identify a pose, e.g., a location and/or orientation within region 307, where localization processing can switch from using sensor 301 to using sensor 303. The pose may correspond to a set of poses corresponding to the device 400 being anywhere within the overlap of regions 305 and 307. Sensor 303 can be activated before the switch and sensor 301 can be deactivated after the switch to avoid degradation or failure of the device 400 localization. The operation to switch the localization operation from using data from sensor 301 to instead using data from sensor 303, may include a period of time when the localization operation uses data from both sensors 301 and 303.

Because sensors inherently have certain operational constraints, e.g., light sensitivity, different types of sensors can provide different levels of localization performance when subject to different geographic area characteristics. The device 400 is configured to switch between different types of sensors based on their respective localization performance as a function of differing characteristics of geographic areas the device 400 is moved through. The device 400 may also be configured to control the switching based on how much energy the different sensors consume and/or how much other system resources, e.g., processing, memory, communication bandwidth, etc., are utilized to receive, store, and/or process through algorithms data from the sensors. The decision to activate and deactivate sensors and to switch from using one sensor to using another sensor for localization operations, can be performed based on a combination of the localization performance that can be achieved using data from the perspective and based on how much energy or other resources are used by the respective sensors. Moreover, the switch from using one sensor to using another sensor can be delayed until the device reaches a pose where the localization operation can be performed without reduction in accuracy of the localization operation or without an unacceptable reduction in accuracy of the localization operation, e.g., to prevent failure of the localization operation during the switch between sensors and resulting loss of tracking of the device pose.

Referring again to FIGS. 1 and 2, in some embodiments the device is configured to perform the following operations:

1. Detect need for deactivating Sensor A and for activating Sensor B;
2. Detect the current device pose P (while only Sensor A is active);
3. Determine device poses PA with a desired SLAM performance with Sensor A;
4. Determine device poses PB with a desired SLAM performance with Sensor B;
5. Determine device pose PF_B which is the pose at which Sensor B should be activated, and the device pose PF_A which is the pose at which Sensor A should be deactivated, where both poses PF_B and PF_A are expected to provide a desired SLAM performance when processing data from both Sensors A and B; and
6. Direct the device to the determined area/poses (e.g. display information to guide a user, or control the motion of the device such as when the device is transported by an autonomous vehicle or semi-autonomous vehicle).

Referring to the third through fifth element of the above operations, in some embodiments, a further operation is defined for controlling activation and deactivation of sensors transported with a device performing localization operations for performing combined localization and mapping operations, e.g., SLAM operations.

Referring to the operational embodiment of FIG. 6, the device is configured to perform operations that include determining 601 a first set of device poses (PA) where a first sensor satisfies a localization performance rule. The operations further determine 603 a second set of device poses (PB) where a second sensor satisfies the localization performance rule. The operations responsively activate 605 the second sensor based on a pose of the second sensor device transitioning from not being within to being within the second set of device poses (PB).

In an optional further embodiment, the operations deactivate 607 the first sensor based on a pose of the first sensor device transitioning from being within to not being within the first set of device poses (PA) while poses of the device remain within the second set of device poses (PB).

Referring to the further operational embodiment of FIG. 7, the operations can direct 701 movement of the device to transition a pose of the second sensor from not being within to being within the second set of device poses (PB). The operations to direct 701 movement of the device may include providing information through a user interface of the device (e.g., displaying information, generating audible information, generating tactile feedback, etc.) that guides a user how to move the device to transition poses of the device from not being within to being within the second set of device poses (PB). Alternatively or additionally, the operations to direct 701 movement of the device may include providing guidance information to a navigation system of the device that controls movement of the device and sensors (e.g., an autonomous vehicle or semi-autonomous vehicle) to transition poses of the device from not being within to being within the second set of device poses (PB).

Figure 2:
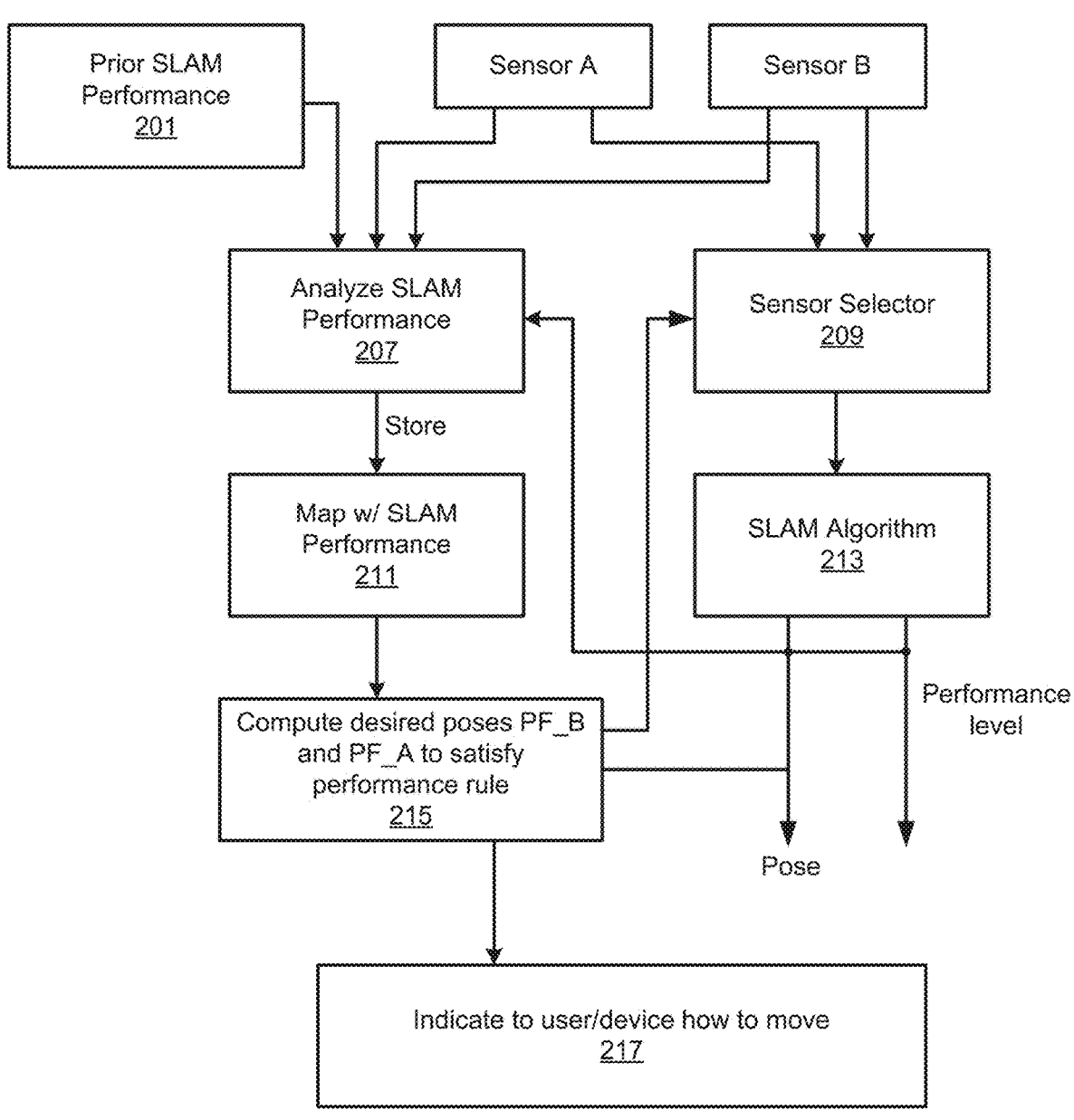
FIG. 2 illustrates a system diagram of the device components used for activating and deactivating sensors while performing localization or performing localization and mapping operations such as SLAM in accordance with some embodiments of the present disclosure.

FIG. 2 illustrates a system diagram of the device components used for activating and deactivating sensors while performing localization or performing localization and mapping operations such as SLAM in accordance with some embodiments of the present disclosure. The performance of both Sensor A and B is analyzed (component 207) based on prior performance (e.g., localization performance, combined localization and mapping performance, SLAM performance) and associated device poses which are obtained from component 210, and the analyzed performance and associated device poses are stored in a geographic map (component 211). The analyzed performance is then used to determine (component 215) the desired poses PF_A and PF_B where the Sensors A and B should be deactivated and activated respectively. This information is provided to a sensor selector block (component 209) which decides which sensor should be selected to provide sensor information to the SLAM algorithm (component 213). An indication or actuation is provided (component 217) to the user or device as guidance for how to move the device to obtain pose PF_A and PF_B.

Various different operations can be used for determining the localization performance or localization and mapping (e.g., SLAM) performance for each Sensor A and B. This information can be determined online (e.g. to track in real-time when a sensor is performing worse). In some embodiments, the device determines the first set of device poses where the Sensor A satisfies a localization performance rule, determines a second set of device poses where Sensor B satisfies the localization performance rule, activates Sensor B while the Sensor A is active based on a pose of the device transitioning from not being within to being within the second set of device poses. In this manner, the device can control activation of the Sensor B and timing for when it switches from performing localization using data from Sensor A to using data from Sensor B based on a device pose being achieved which will provide acceptable localization performance.

In some embodiments, localization performance or localization and mapping (e.g., SLAM) performance can be quantified by one of many factors, including but not limited to the number of false re-localizations, amount and quality of features in a region, the localization error (position and orientation of the device), position/orientation drifts, among other metrics. False re-localization can correspond to error associated with when a device has localized itself in a wrong part of a map, which is not where the device is located. Localization error can correspond to a difference between an estimated pose of the device and the actual pose of the device.

False re-localizations and localization error can typically be characterized with higher certainty and/or accuracy aposteriori after a SLAM session is complete, for example when the map is further optimized and several devices/agents have contributed with information to improve said map. At that point, the sensor data from the previous passage in that area can be fed again to the SLAM algorithm with an optimized map and a comparison can be made between the new and the old trajectory and an error can be computed. Additionally, if known features (landmarks) are available in a region with known ground truth poses, as e.g. fiducial markers, specific objects or environment features such as a door, a window, etc. a localization error can be computed against said landmarks.

Referring to the operational embodiment of FIG. 6, the determination 601 of the first set of device poses (PA) where the first sensor satisfies the localization performance rule may include determining a localization performance score for the first sensor at one or more poses based on at least one of a determined number of false re-localizations determined based on data from the first sensor, a determined number and quality of measurements of features in a region measured by data from the first sensor, a localization error determined based on data from the first sensor, and an amount of uncertainty in measurements based on data from the first sensor. The determination 601 may alternatively or additionally include determining whether the localization performance score of the first sensor at the one or more poses satisfies the localization performance rule. Similarly, the determination 603 of the second set of device poses (PB) where the second sensor satisfies the localization performance rule can include determining a localization performance score for the second sensor at one or more poses based on at least one of a determined number of false re-localizations determined based on data from the second sensor, a determined number and quality of features in a region measured by data from the second sensor, and a localization error determined based on data from the second sensor. The determination 603 whether the second sensor satisfies the localization performance rule may include determining whether the localization performance score of the second sensor at the one or more poses satisfies the localization performance rule.

In some embodiments, the information collected to quantify the localization performance or localization and mapping (e.g., SLAM) performance is collected and stored in a localization map which indicates for defined poses or areas in the map what performance information is obtained using various sensors. This information may be collected by both the current device when the sensors were respectively active, and may be collected from other devices which have previously been at these locations and with the same type of sensors or other types of sensors being actively used for localization. The map may store information that identifies poses which are associated with performance data for different sensors. The performance data may be retrieved from the map for particular sensor identifiers (unique to each sensor), based on types of sensors (e.g. monocular cameras, stereo cameras, LIDAR, etc.), and/or based on one or more operational characteristics of the sensors (e.g., camera resolution, camera sensitivity, etc.). Thus, for example, the device may query the map using a particular sensor identifier, using a type of sensor, or using one or more operational characteristics of a sensor in order to determine from the information in the map a pose of the device or set of poses of the device for which the sensor will satisfy a localization performance rule (i.e., output data that when processed through a localization algorithm will provide device localization that satisfies the localization performance rule).

Referring to the operational embodiment of FIG. 9, the determination 601 of the first set of device poses (PA) where the first sensor satisfies the localization performance rule includes determining 901 localization of the first sensor relative to a map defined by a data structure identifying previously sensed features of a localized environment, i.e., features of the environment that were previously sensed by the first sensor, another sensor that is operationally similar to the first sensor, and/or another type of sensor. The determination 601 also includes determining 903 a localization performance score for the first sensor with the device at one or more poses based on whether the first sensor senses the previously sensed features identified by the data structure. The determination 601 also includes determining 905 whether the localization performance score for the first sensor with the device at the one or more poses satisfies the localization performance rule.

Referring to the operational embodiment of FIG. 10, the determination 603 of the second set of device poses (PB) where the second sensor satisfies the localization performance rule includes determining 1001 a localization performance score for the second sensor with the device at one or more poses based on whether the second sensor senses the previously sensed features identified by the data structure. The determination 603 also includes determining 1003 whether the localization performance score for the second sensor with the device at the one or more poses satisfies the localization performance rule based on whether the second sensor senses the previously sensed features identified by the data structure.

Referring to the operational embodiment of FIG. 11, the determination 601 of the first set of device poses (PA) where the first sensor satisfies the localization performance rule includes determining 1101 localization of the first sensor relative to a map defined by a data structure identifying positions of features of a localized environment, which may have been defined by a user in the data structure, previously sensed and added to the data structure, or input to the data structure by any other process. The determination 601 also includes determining 1103 a localization performance score for the first sensor with the device at one or more poses based on comparison of where the first sensor identifies the positions of the features to where the data structure identifies the positions of the features. The determination 601 also includes determining 1105 whether the localization performance score for the first sensor with the device at the one or more poses satisfies the localization performance rule.

Referring to the operational embodiment of FIG. 12, the determination 603 of the second set of device poses (PB) where the second sensor satisfies the localization performance rule includes determining 1201 a localization performance score for the second sensor with the device at one or more poses based on comparison of where the second sensor identifies the positions of the features to where the data structure identifies the positions of the features. The determination 603 also includes determining 1203 whether the localization performance score for the second sensor with the device at the one or more poses satisfies the localization performance rule.

Referring to the operational embodiment of FIG. 13, the determination 601 of the first set of device poses PA where the first sensor satisfies the localization performance rule includes determining 1301 localization of the device to locations within a map defined by a data structure which identifies localization performance scores for devices at the locations. The determination 601 also includes retrieving 1303 a localization performance score for the first sensor from the data structure based on the localization of the device to the locations. The determination 601 also includes determining 1305 whether the localization performance score for the first sensor satisfies the localization performance rule.

Referring to the operational embodiment of FIG. 14, the determination 603 of the second set of device poses (PB) where the second sensor satisfies the localization performance rule includes retrieving 1401 a localization performance score for the second sensor from the data structure based on the localization of the device to the locations. The determination 601 also includes determining 1403 whether the localization performance score for the second sensor satisfies the localization performance rule.

Figure 4:
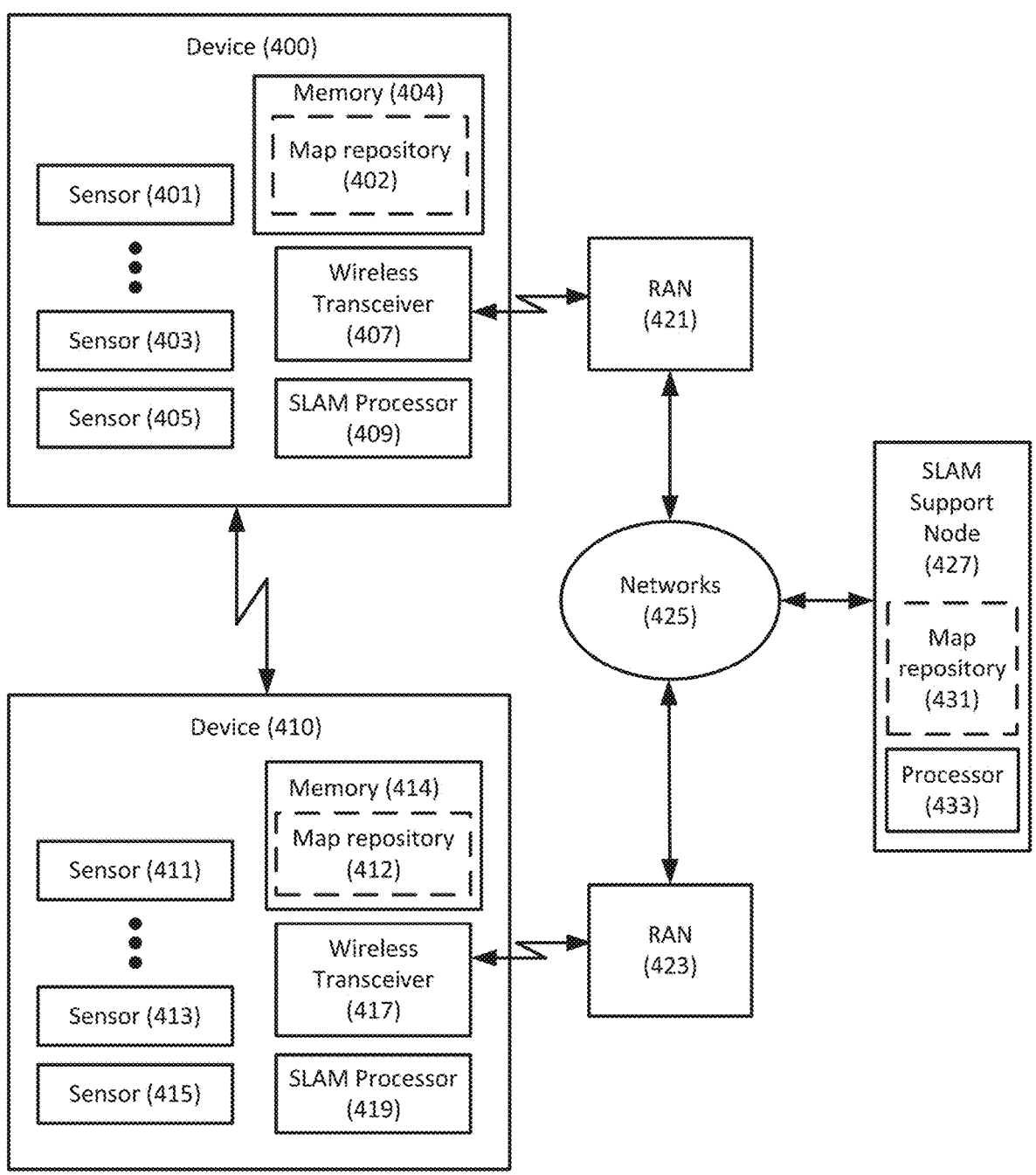
FIG. 4 illustrates a SLAM system that includes a pair of devices each connected to respective sets of sets of sensors, and includes a SLAM support node which operate in accordance with some embodiments of the present disclosure.

In some embodiments, the localization performance scores for first and second sensors are determined based on accessing the data structure of the map stored in a networked data repository, e.g., the map repository 431 in the SLAM support node 427 of FIG. 4.

In some embodiments, the localization performance scores for first and second sensors are determined based on accessing the data structure of the map repository 402 stored in the memory 404 of the device 400.

Some embodiments are directed to detecting a need for activating one sensor and for deactivating another sensor which may be motivated by one or both of the following embodiments.

In a first embodiment, a current or predicted decrease of the localization performance when using Sensor A is determined, where it is believed that Sensor B will perform better. For example, if Sensor A is a monocular camera and Sensor B a LIDAR, the current or predicted region may contain few visual features to be detected by Sensor A, while the structure of the environment may be well tracked by Sensor B. As another example, based on recorded information, it is known that the light conditions or the visual texture of the environment in different parts of a building are different which have seriously impacted the localization performance at previous occasions. This information can be extracted from the map built with the localization performance based on Sensor A and B.

Referring to the operational embodiment of FIG. 15, the operations can further include initiating 1501 activation of the second sensor (Sensor B) based on determining at least one of a currently measured decrease in localization performance of the first sensor (Sensor A) and a predicted decrease in localization performance of the first sensor (Sensor A).

In a second embodiment, Sensor A consumes more power when operating than Sensor B and therefore is less energy efficient for the device to operate using. Referring to the operational embodiment of FIG. 16, the operations can further include initiating 1601 activation of the second sensor (Sensor B) based on determining that the first sensor (Sensor A) uses more than a threshold amount of a defined hardware resource. The defined hardware resources may include at least one of power consumption, processor utilization, memory utilization, and network communication utilization.

Some embodiments are directed to determining device poses PA and PB, which may include the operations discussed below.

In one embodiment, given the currently available map, which contains information of the localization performance for Sensor A and Sensor B per device pose as explained above, a search is made for device poses Z where the localization performance using Sensor X is above a certain threshold. The pose set Z may encompass all possible poses for the device, or it may be optimized for the most suitable poses (e.g. do not consider poses where the device is pointing to the floor or to the ceiling, etc.).

In another embodiment, the search in the map is performed within a region that is maximum Y meters away from the current position of the device, for a given set of poses Z. The value of Y can be defined based on the energy available, the deadline for performing the sensor transition, the current and predicted trajectory of the device, among other parameters.

In some embodiments, as illustrated in FIGS. 4, 7, and 8, the method for performing localization using a set of sensors 401, 403, and 405, that are transportable with the device 400 further includes searching 801 among the second set of device poses (PB) to identify a subset of at least one device pose for the second sensor (Sensor B) where localization performance of the second sensor (Sensor B) satisfies the localization performance rule. The directing 701 of the movement of the device is performed to guide movement of the second sensor (Sensor B) toward the at least one device pose in the subset.

In some embodiments, the searching 801 among the second set of device poses (PB) may be constrained to identifying only poses among the second set of device poses (PB) that are within a threshold distance away from a present location of the device. The threshold distance may be determined based on at least one of remaining battery power within the device, remaining time before occurrence of a deadline for performing sensor transition, and an amount of deviation from a current movement trajectory of the device that would be needed for the device to be moved to one of the second set of device poses (PB).

In some embodiments, the operations to search 801 among the second set of device poses (PB) may be constrained to identifying only poses among the second set of device poses (PB) that are within a threshold closeness to a present pose of the second sensor.

In some embodiments, the operations to search 801 among the second set of device poses (PB) may be performed to identify poses among the second set of device poses (PB) where the first and second sensors will both have SLAM performance that satisfy the SLAM performance rule.

With further reference to FIG. 7, in some embodiments the operations to direct 701 movement of the device to transition a pose of the device from not being within to being within the second set of device poses (PB), may include identifying a sequence of device poses from among the second set of device poses (PB), and directing movement of the device to transition the device through the sequence of device poses while performing operations to activate the second sensor and deactivate the first sensor.

Some further embodiments are directed to determining a device pose PF_B which is the pose at which Sensor B should be activated, and determining the device pose PF_A which is the pose at which Sensor A should be deactivated.

In one embodiment, based on pose sets PA and PB, it is determined the pose set PX which is contained in set PA and PB, which is the intersection of both sets, e.g., overlap of regions 305 and 307 in FIG. 3. The final pose PF can then be determined in various ways, for example PF may be the pose which is the closest to the current device pose P, or the pose which maximizes the localization performance for both Sensors A and B, or a combination of both.

In another embodiment, the pose PF may also be a set of continuous poses to be followed by the device (i.e. trajectory), which may contain the set of poses PF_A where Sensor A will perform well, followed by the set of poses PF_AB where both sensors perform have a localization performance above a certain threshold, followed by the set of poses PF_B where only Sensor B performs well.

Based on this solution, there will be a smooth degradation of performance when there is a transition between using Sensor A and Sensor B, and one will avoid the case where a forced switch between one sensor and another has to be performed, where it will be unknown if the new sensor will perform well. The sensor transition can then be performed in a planned manner so one makes sure that a certain localization performance is forecasted to occur.

In one embodiment, the current map is enhanced in desired areas/poses so that the localization performance, e.g., SLAM performance, in those desired areas is above a defined threshold. For example, considering that Sensor A is an RGB+IMU and Sensor B is a depth sensor or 3D sensor such as a LiDAR or stereo camera, this enhancement could be to densify RGB+IMU data to get better depth features in a certain area so that the depth sensor or 3D sensor can perform better localization in such area when turned on. Conversely, the enhancement could be to download additional keyframes to the device so that the RGB+IMU sensor can perform better when turned on.

In one embodiment, the information retrieved from the map to compute the performance of a given sensor in a given area is weighted based on the temporal characteristics of the information. For example, more trust is placed on data that has been captured recently. Additionally, more trust can be placed on data which was captured at the same time of the day so that the light conditions are likely to be the same.

In one embodiment, if both sensors are active during the transition, the fusion of the information between the two sensors is performed so that a higher localization performance can be achieved.

FIG. 4 illustrates a system 450 that includes a pair of devices 400 and 410 which are each connected to respective sets of sets of sensors and operate in accordance with some embodiments of the present disclosure. The example system 450 can further include a SLAM support node 427. Although the system of FIG. 4 is described in the context of activating and deactivating sensors during SLAM processing, these embodiments are not limited to use with SLAM and can more generally be used to activate and deactivate sensors during localization operations or during combined localization and mapping operations which may or may not be based on SLAM.

A first device 400 can include or be operationally connected to a first set of sensors 401, 403, and 405, that can be transported with the first device 400. A second device 410 can include or be operationally connected to a second set of sensors 411, 413, and 415, that can be transported with the second device 410. In some embodiments, the first device 400 determines 601 (FIG. 6) a first set of device poses (PA) where a first sensor (e.g., sensor 401) satisfies a localization performance rule and determines 603 (FIG. 6) a second set of device poses (PB) where a second sensor (e.g., sensor 403) satisfies the localization performance rule.

In some embodiments the first device 400 can be assisted in performing the determinations 601 and/or 603 based on information that is obtained from the second device 410 and/or from the SLAM support node 427. For example, when the first device 400 is proximately located to the second device 410, the first device 400 may operationally assume it can successfully use for localization the same or sufficiently similar types of sensors as what the second device 410 is actively using to perform localization. Accordingly, the first device 400 may be configured to query the second device 410 to obtain a listing of sensors (e.g., one or more sensors) that the second device 410 is actively using to perform localization, and then determine from the listing which, if any, of the sensors in its first set 401, 403, and 405, can be used to perform localization while satisfying the localization performance rule.

In one illustrative further example, assume the first device 400 is proximately located to the second device 410, assume the first second of sensors 401, 403, and 405, are respectively identical (or respectively satisfy a threshold level of operational similarity) to the second set of sensors 411, 413, and 405, and assume the second device 410 reports that it is actively using sensor 411 and is not using sensors 413 and 415 for localization. The first device 400 can then correspondingly determine that it is presently posed where sensor 401 will satisfy the localization performance rule (e.g., based on devices 400 and 410 being proximately located and sensor 411 being actively used by second device 410), and further determine that sensors 403 and 405 will not satisfy the localization performance rule.

In some other embodiments the first device 400 can be assisted in performing localization using data from one or more of the sensors 411, 413, and 415, of the second set being transported with the second device 410. For example, when the first device 400 is proximately located to the second device 410 and is further communicatively connected to the second device 410 via a sufficient bandwidth communication channel, the first device 400 may query the second device 410 to obtain a listing of sensors (e.g., one or more sensors) that the second device 410 is actively using to perform localization, and then determine from the listing which, if any, of the sensors in the second set 411, 413, and 415, can be used by the first device 400 to perform localization while satisfying the localization performance rule. The first device 410 may use the received listing to decide to switch from using one or more of the sensors in the first set 401, 403, and 405, to using data from one or more sensors in the second set 411, 413, and 415, for localization of the first device 400. In a further embodiment, the first device 400 may request the second device 410 to activate one of the sensors in the second set 411, 413, and 415, and to further provide data from the activated senor to the first device 400 based on the first device 400 determining that, for example, none of the sensors in the first set 401, 403, and 405, will satisfy the localization performance rule for a present pose of the first device 400.

The first device 400 and the second device 410 can be, but are not limited to, a component of any of a smartphone, wearable computer, augmented reality headset, virtual reality headset, mixed reality headset, semi-autonomous or autonomous vehicle, aircraft, robot, ship, etc. The first device 400 and the second device 410 and their connected sensors are transportable in any manner, such as by a person, vehicle, drone, aircraft, ship, robot, etc. Example types of sensors include, but are not limited to, RGB visible light camera, infrared camera, inertial measurement unit (IMU), radar sensor, stereo cameras (visible and/or infrared), light detection and ranging (LIDAR) sensor, acoustic ranging sensor, proximity sensor, GPS, and RF transceiver (e.g., 5G-radio).

The first device 400 includes a SLAM (or localization) processor 409, a memory 404, and a wireless transceiver 407 that can communicate with the second device 310 and/or SLAM (or localization) support node 427 via a radio access node (RAN) 421 or 423. The processor 409 is operationally connected to the first set of sensors 401, 403, 405. The memory 404 stores program code that is executed by the processor 409 to perform operations, and may store a map repository 402. The operations performed by the SLAM processor 409 can include some or all of the operations described herein relating to controlling sensor activation and/or deactivation and, more particularly, the operations described herein in the context of any one or more of FIGS. 6-16.

The second device 410 can be similarly configured to the first device 400. The second device 410 includes the set of sensors 411, 413, and 415, a SLAM (or localization) processor 419, a wireless transceiver 417, and a memory 414 storing program code that is executed by the processor 419 to perform operations and may further store a map repository 412. The processor is operationally connected to the set of sensors 411, 413, and 415.

The first device 400 and/or the second device 410 can be configured to contain program code and related circuitry needed to perform operations to control sensor activation and deactivation and perform localization operations and may further perform mapping operations, such as SLAM algorithm processing. Some of the localization and/or mapping operations for the first device 400 may be performed by a networked node, such as the illustrated SLAM support node 427, and/or by the second device 410. Similarly, some of the localization and/or mapping operations for the second device 410 may be performed by a networked node, such as the illustrated SLAM support node 427, and/or by the first device 400.

The devices 400 and 410 can be configured to communicate with the SLAM support node 427 via one or more of the radio access networks (RANs) 421 and 423 and the networks 425. The SLAM support node 427 includes a processor 433 that can be configured to perform some or all of the operations for activating and deactivating sensors transported with the first device 400 and/or the second device 410 according to one or more of the embodiments disclosed herein. The SLAM support node 427 may store the MAP repository 431 that can be used to determine which sensors to activate or deactivate, and to determine when to activate or deactivate sensors based on poses of the first device 400 and/or the second device 410.

Figure 5:
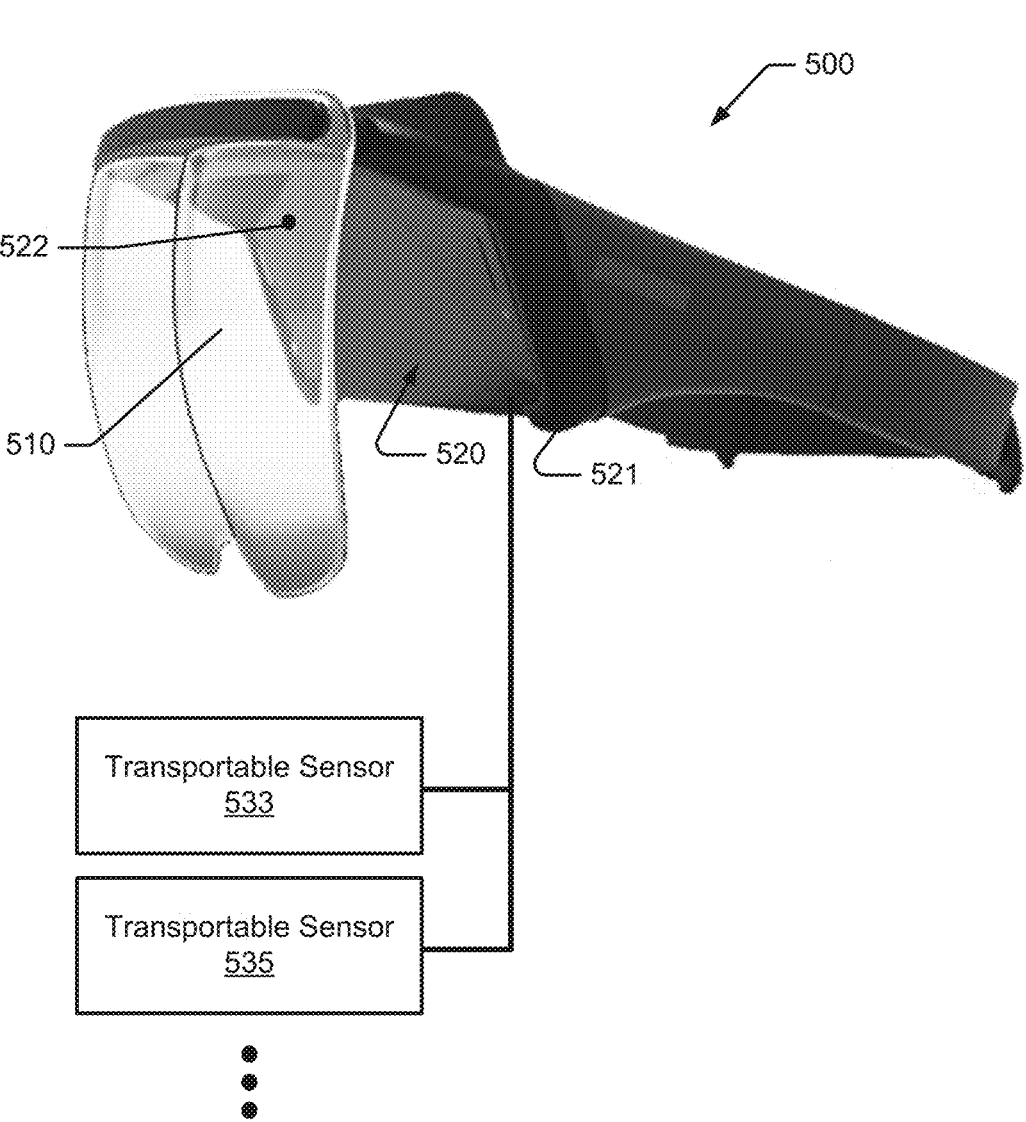
FIG. 5 illustrates a mixed reality (MR) system that includes a MR headset that holds a mobile electronic device which can include or is operationally connected to a set of sensors and configured to operate in accordance with some embodiments of the present disclosure.

FIG. 5 illustrates a mixed-reality (MR) system that includes a MR headset 500 that holds a mobile electronic device 520 which can include (e.g., built-in) a camera 522 and be operationally connected to a set of sensors 533, 535, etc. The mobile electronic device 520 can include a processor and a memory storing program code that configures the processor to activate and deactivate individual ones of the sensors 522, 533, 535 while using the active ones of the sensors 522, 533, 535 to perform localization. The MR headset 500 includes a lens 510 through which a user who is wearing the MR headset can view real-world features. The MR headset 500 further includes a holder 521 that is configured to releasably retain the mobile electronic device 520 in a defined orientation relative to the lens 510.

The mobile electronic device 520 includes a display device and a processor. The camera 522 is configured to output digital pictures (e.g., still pictures and/or video) and arranged by the holder 521 to view at least a portion of the lens 510 of the MR headset 500. The display device is arranged to display information that is projected on the lens 510 for reflection directly or indirectly toward the user's eyes, i.e., while wearing the MR headset 500, and the camera 533 of the mobile electronic device 520. Although not shown, the headset may include intervening mirrors that are positioned between the lens 510 and the user's eyes and/or the camera 522 and, hence the light may be reflected directly or indirectly toward the user's eyes and/or the camera 522.

The mobile electronic device 520 can include, but is not limited to, a smart phone, a palmtop computer, a tablet computer, gaming device, or other computing device. A "mobile electronic device" is also referred to herein as a "mobile device" and "device" for brevity.

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A device configured for performing localization using a set of sensors that are transportable with the device, the device comprising:

at least one processor operationally connected to the set of sensors;

at least one memory having instructions stored therein that are executable by the at least one processor to cause the at least one processor to perform operations comprising:

determining a first set of device poses where a first sensor satisfies a localization performance rule, the first sensor satisfying the localization performance rule when at least one of:

first data obtained from the first sensor and processed by a localization operation results in device localization with an accuracy that satisfies the localization performance rule; and an estimate of an accuracy of device localization that would be achieved using the first data would satisfy the localization performance rule;

determining a second set of device poses where a second sensor satisfies the localization performance rule, the second sensor being separate from the first sensor, the second sensor satisfying the localization performance rule when at least one of:

second data obtained from the second sensor and processed by the localization operation results in device localization with an accuracy that satisfies the localization performance rule; and an estimate of an accuracy of device localization that would be achieved using the second data would satisfy the localization performance rule;

directing movement of the device to transition a pose of the device from not being within the second set of device poses to being within the second set of device poses; and activating the second sensor while the first sensor is active based on the pose of the device transitioning from not being within the second set of device poses to being within the second set of device poses.

2. The device of claim 1, the operations further comprising:

deactivating the first sensor based on the pose of the device transitioning from being within the first set of device poses to not being within the first set of device poses while the pose of the device remains within the second set of device poses.

3. The device of claim 2, wherein activating the second sensor comprises one of:

triggering the second sensor to transition to a higher power state; and triggering power-on of the second sensor, and wherein deactivating the first sensor comprises one of:

triggering the first sensor to transition to a lower power state; and triggering power-off of the first sensor.

4. The device of claim 2, wherein deactivating the first sensor comprises:

setting a data sampling rate of the first sensor to one of a reduced sampling rate and zero; or setting a resolution of the first sensor to a reduced resolution or zero.

5. The device of claim 1, wherein directing the movement of the device comprises providing information through a user interface of the device that guides movement of the device to transition the pose of the device from not being within the second set of device poses to being within the second set of device poses.

6. The device of claim 1, wherein directing the movement of the device comprises providing guidance information to a navigation system of the device that controls movement of the device to transition the pose of the device from not being within the second set of device poses to being within the second set of device poses.

7. The device of claim 1, the operations further comprising:

searching among the second set of device poses to identify a subset of at least one device pose where localization performance of the second sensor satisfies the localization performance rule, wherein directing the movement of the device comprises guiding movement of the second sensor toward the at least one device pose in the subset.

8. The device of claim 7, wherein searching among the second set of device poses to identify the subset of at least one device pose where localization performance of the second sensor satisfies the localization performance rule comprises identifying only poses among the second set of device poses that are within a threshold distance away from a present location of the device.

9. The device of claim 8, the operations further comprising:

determining the threshold distance based on at least one of:

remaining battery power within the device;

remaining time before occurrence of a deadline for performing sensor transition; and an amount of deviation from a current movement trajectory of the device that would be needed for the device to be moved to one of the second set of device poses.

10. The device of claim 7, wherein searching among the second set of device poses to identify the subset of at least one device pose where localization performance of the second sensor satisfies the localization performance rule comprises identifying poses among the second set of device poses where the first and second sensors will both have localization performance that satisfy the localization performance rule.

11. The device of claim 1, wherein directing the movement of the device to transition the pose of the device from not being within the second set of device poses to being within the second set of device poses comprises:

identifying a sequence of device poses from among the second set of device poses; and directing movement of the device to transition the device through the sequence of device poses while performing operations to activate the second sensor and deactivate the first sensor.

12. The device of claim 1, wherein determining the first set of device poses comprises:

determining a localization performance score for the first sensor at one or more poses based on at least one of a determined number of false re-localizations determined based on data from the first sensor, a determined number and quality of measurements of features in a region measured by data from the first sensor, a localization error determined based on data from the first sensor, and an amount of uncertainty in measurements based on data from the first sensor, and determining whether the localization performance score of the first sensor at the one or more poses satisfies the localization performance rule, and wherein determining the second set of device poses comprises:

determining a localization performance score for the second sensor at one or more poses based on at least one of a determined number of false re-localizations determined based on data from the second sensor, a determined number and quality of features in a region measured by data from the second sensor, and a localization error determined based on data from the second sensor, and determining whether the localization performance score of the second sensor at the one or more poses satisfies the localization performance rule.

13. The device of claim 1, wherein determining the first set of device poses comprises:

determining localization of the device relative to a map defined by a data structure identifying previously sensed features of a localized environment;

determining a localization performance score for the first sensor with the device at one or more poses based on whether the first sensor senses the previously sensed features identified by the data structure; and determining whether the localization performance score for the first sensor with the device at the one or more poses satisfies the localization performance rule, and wherein determining the second set of device poses comprises:

determining a localization performance score for the second sensor with the device at one or more poses based on whether the second sensor senses the previously sensed features identified by the data structure; and determining whether the localization performance score for the second sensor with the device at the one or more poses satisfies the localization performance rule based on whether the second sensor senses the previously sensed features identified by the data structure.

14. The device of claim 13, the operations further comprising:

determining the localization performance scores for first and second sensors based on accessing the data structure of the map stored in at least one of:

a networked data repository; and a memory of the device.

15. The device of claim 1, wherein determining the first set of device poses comprises:

determining localization of the device relative to a map defined by a data structure identifying positions of features of a localized environment;

determining a localization performance score for the first sensor with the device one or more poses based on comparison of where the first sensor identifies the positions of the features to where the data structure identifies the positions of the features; and determining whether the localization performance score for the first sensor with the device at the one or more poses satisfies the localization performance rule, and wherein determining the second set of device poses comprises:

determining a localization performance score for the second sensor with the device at one or more poses based on comparison of where the second sensor identifies the positions of the features to where the data structure identifies the positions of the features; and determining whether the localization performance score for the second sensor with the device at the one or more poses satisfies the localization performance rule.

16. The device of claim 1, wherein determining the first set of device poses comprises:

determining localization of the device to locations within a map defined by a data structure which identifies localization performance scores for devices at the locations;

retrieving a localization performance score for the first sensor from the data structure based on the localization of the device to the locations; and determining whether the localization performance score for the first sensor satisfies the localization performance rule, and wherein determining the second set of device poses comprises:

retrieving a localization performance score for the second sensor from the data structure based on the localization of the device to the locations; and determining whether the localization performance score for the second sensor satisfies the localization performance rule.

17. The device of claim 1, wherein determining the first set of device poses comprises determining the first set of device poses based on obtaining a listing of sensors that are presently active for use by a proximately located other device, and wherein determining the second set of device poses comprises determining the second set of device poses based on obtaining the listing of sensors that are presently active for use by the proximately located other device.

18. The device of claim 1, the operations further comprising:

initiating activation of the second sensor based on determining at least one of a currently measured decrease in localization performance of the first sensor and a predicted decrease in localization performance of the first sensor.

19. The device of claim 1, the operations further comprising:

initiating activation of the second sensor based on determining that the first sensor uses more than a threshold amount of a defined hardware resource, the defined hardware resources comprising at least one of:

power consumption;

processor utilization;

memory utilization; and network communication utilization.

20. The device of claim 1, wherein the pose of the device comprises an orientation of the device, and wherein activating the second sensor comprises activating the second sensor based on the orientation of the device transitioning from being a first orientation that is not within the second set of device poses to being a second orientation that is within the second set of device poses.

21. The device of claim 1, wherein activating the second sensor comprises activating the second sensor while the first sensor is active and without deactivating the first sensor.

22. A method by a device performing localization using a set of sensors that are transported with the device, the method comprising:

determining a first set of device poses where a first sensor satisfies a localization performance rule, the first sensor satisfying the localization performance rule when at least one of:

first data obtained from the first sensor and processed by a localization operation results in device localization with an accuracy that satisfies the localization performance rule; and an estimate of an accuracy of device localization that would be achieved using the first data would satisfy the localization performance rule;

determining a second set of device poses where a second sensor satisfies the localization performance rule, the second sensor being separate from the first sensor, the second sensor satisfying the localization performance rule when at least one of:

second data obtained from the second sensor and processed by the localization operation results in device localization with an accuracy that satisfies the localization performance rule; and an estimate of an accuracy of device localization that would be achieved using the second data would satisfy the localization performance rule; and activating the second sensor while the first sensor is active based on a pose of the device transitioning from not being within the second set of device poses to being within the second set of device poses, wherein determining the first set of device poses comprises determining the first set of device poses based on obtaining a listing of sensors that are presently active for use by a proximately located other device, and wherein determining the second set of device poses comprises determining the second set of device poses based on obtaining the listing of sensors that are presently active for use by the proximately located other device.

23. The method of claim 22, further comprising:

directing movement of the device to transition the pose of the device from not being within the second set of device poses to being within the second set of device poses.

24. A non-transitory computer readable medium storing instructions that are executable by at least one processor of a device using a set of sensors that are transported with the device to cause the at least one processor to perform operations comprising:

determining a first set of device poses where a first sensor satisfies a localization performance rule, the first sensor satisfying the localization performance rule when at least one of:

first data obtained from the first sensor and processed by a localization operation results in device localization with an accuracy that satisfies the localization performance rule; and an estimate of an accuracy of device localization that would be achieved using the first data would satisfy the localization performance rule;

determining a second set of device poses where a second sensor satisfies the localization performance rule, the second sensor being separate from the first sensor, the second sensor satisfying the localization performance rule when at least one of:

second data obtained from the second sensor and processed by the localization operation results in device localization with an accuracy that satisfies the localization performance rule; and an estimate of an accuracy of device localization that would be achieved using the second data would satisfy the localization performance rule;

directing movement of the device to transition a pose of the device from not being within the second set of device poses to being within the second set of device poses; and activating the second sensor while the first sensor is active based on the pose of the device transitioning from not being within the second set of device poses to being within the second set of device poses.

* * * * *